Jan. 31, 1956   E. NIELSEN   2,732,677
CRANBERRY STRIPPING MACHINE
Filed April 30, 1954   2 Sheets-Sheet 1

INVENTOR.
EINER NIELSEN
BY
Reynolds, Beech & Christensen
ATTORNEYS

Jan. 31, 1956
E. NIELSEN
2,732,677
CRANBERRY STRIPPING MACHINE
Filed April 30, 1954
2 Sheets-Sheet 2
Fig. 2.
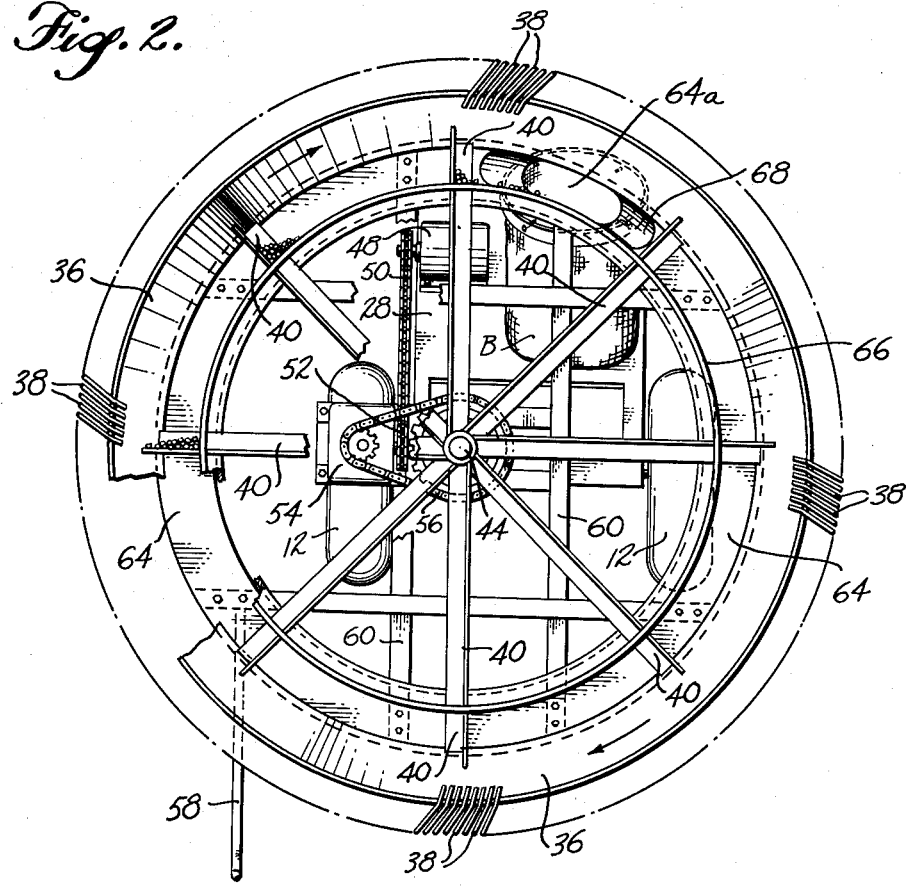
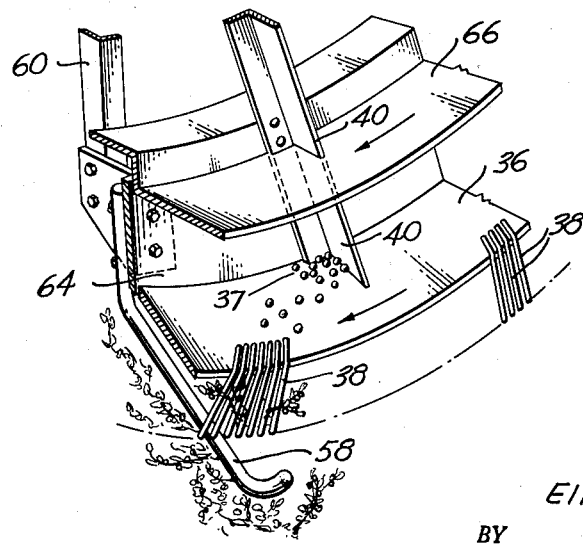
Fig. 3.
INVENTOR.
EINER NIELSEN
BY
Reynolds, Beach & Christensen
ATTORNEYS United States Patent Office 2,732,677
Patented Jan. 31, 1956

2,732,677

CRANBERRY STRIPPING MACHINE

Einer Nielsen, near Grayland, Wash.

Application April 30, 1954, Serial No. 426,742

15 Claims. (Cl. 56—330)

This invention relates to apparatus for the harvesting of cranberries and in general comprises a novel, power-operated, comb type cranberry picker having certain important advantages over earlier types and over use of manual combing rakes. The invention is herein illustratively described by reference to its presently preferred form; however, it will be evident to those skilled in the art that certain changes and modifications therein may be made without departing from the inventive principles.

An important object of the present invention is a cranberry harvesting machine of the comb type wherein the combing of plants is more efficiently conducted with less injury to plants and with less stripping of foliage than heretofore. This object is achieved by providing a rotary comb or stripper and associated drive mechanism so arranged that the berry-laden plants are received continuously in the spaces between comb teeth as the machine advances and are stripped of berries by moving the teeth continuously in a direction generally transverse to their length. In accordance with the disclosed embodiment of the invention, the rotary stripping comb has its axis of rotation contained generally in a vertical plane extending substantially in the line of advance of the machine and is mounted on a carriage with the lower side of the toothed rotor disposed generally parallel to the ground. The comb teeth project forwardly from the forward peripheral edge of the rotor so that these teeth penetrate through the cranberry plants as the machine advances and as the rotor revolves continuously in one direction during such advance strip such plants of berries. Preferably the comb teeth are mounted so as to lie in a frusto-conical pattern, and the rotational axis is forwardly and upwardly inclined in relation to the ground by approximately one-half the cone angle, so that the teeth which at any instant lie along the lower side of the cone are substantially parallel to the ground. By thus inclining the comb, the mechanical arrangements for carrying the picked berries to a container may be relatively simple, and it becomes possible for an operator seated in the machine to observe the action of the comb on the plants and thereby regulate the operation of the machine to achieve best results.

Another object of the invention is a cranberry harvesting machine of the type described wherein the stripping of plants along any swath may be efficiently conducted without disturbing adjoining plants which are carrying berries not yet harvested.

Another object is a cranberry picking machine of the type described wherein the height above ground of the active comb teeth, i. e. on the lower side of the rotary comb, may be easily adjusted in order to operate most efficiently with any of different types of plant growth, i. e. highly matted, low to the ground, sparse and high growing, etc.

These and other features, objects and advantages of the invention will become more fully evident from the following description by reference to the accompanying drawings.

Figure 2 is a front view of the machine taken on the inclined line 2—2 in Figure 1, with parts broken away and with the rear portion of the machine being omitted from the view for convenience in illustration.

Figure 3 is an enlarged perspective view of a fragmentary segment of the rotor member instantaneously constituting the lower side portion of the rotor member, the view also showing the ground engaging runner element cooperating with such rotor member.

Figure 1:
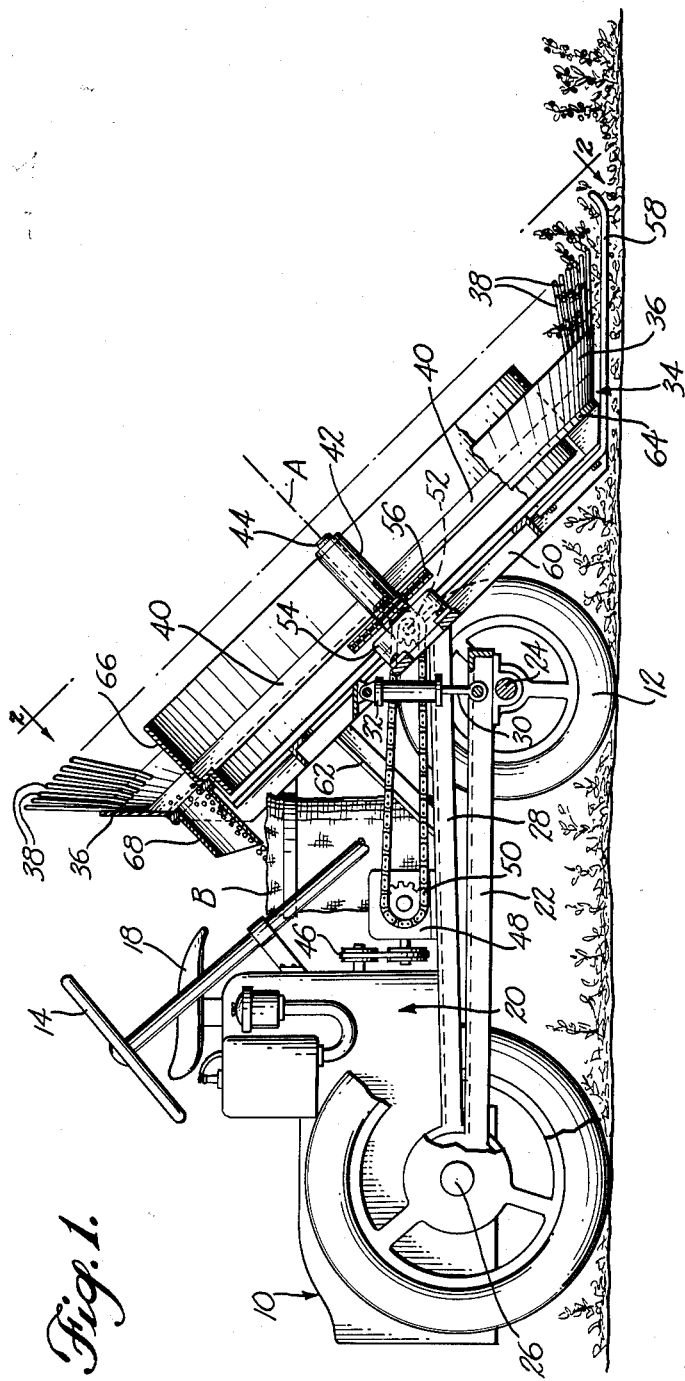
Figure 1 is a side elevation view of the improved cranberry harvesting machine with parts thereof broken away and illustrated in section to show certain details of construction.

As illustrated, the apparatus for stripping berries from the plants is carried by a mobile carriage such as the wheeled vehicle 10. This vehicle comprises steerable front wheels 12 controlled by the steering wheel 14 through suitable connections not illustrated, and power driven rear traction wheels 16. An elevated seat 18 is provided for the operator and power for the traction wheels 16 is delivered through a suitable transmission (not shown) from the power source 20 of any suitable type, conveniently a gasoline driven engine. The vehicle frame is comprised of a base portion 22 mounted on the front and rear wheel axles 24 and 26, respectively, so as to remain at substantially constant height above the ground, and a rotor mount portion 28 which can be raised and lowered relative to the base portion 22. The details of construction of the base portion and rotor mount portion of the vehicle are, of course, subject to considerable variation and are not illustrated in full in the drawings. The preferred construction, however, is that in which the rotor mount portion 28 is in the form of a box frame which is pivotally supported near its rear edge on the rear axle 26, as illustrated in the drawings. Thus, the rotor mount portion 28 may be raised and lowered at its front end relative to the base portion 22 by pivoting on the rear axle of the vehicle in order to raise and lower the combing rotor 34 carried by the mount portion 28 in the manner and for purposes hereinafter described.

Relative height of the frame rotor mount portion 28 to the frame base portion 22 is controlled at all times by the operator. Such height adjustments are effected in the illustrative case through the hydraulic jack comprising the piston rod 30 connected to the frame base portion 22 and the cylinder 32 connected to the rotor mount portion 28 near the forward end thereof. Suitable operator-controlled means providing hydraulic fluid under pressure for extending and contracting the hydraulic jack are provided and although not shown may be of any conventional or suitable form permitting the operator to effect the desired elevational adjustments of the forward end of the rotor mount portion 28.

In case the cranberry plants are growing in flooded fields the machine carriage could be designed to float on the water's surface and be driven by an air propeller or other suitable means (not shown) in order to cover the field for harvesting purposes, it being evident that any suitable carriage may be used by which the harvesting machine may be caused to traverse cranberry fields.

The rotor member 34 is of open-end preferably frusto-conical form mounted on the forward end of the vehicle frame portion 28 to rotate about a forwardly inclined axis A contained in a vertical plane extending in the direction of normal travel of the machine. As illustrated, the rotor member comprises the forwardly divergent frusto-conical shell 36 supporting a plurality of comb teeth 38 which project generally endwise from the base or large end of the shell at closely spaced locations around the entire end periphery thereof to constitute an endwise continuation of the geometric form of the conical shell. As shown best in Figures 2 and 3, wherein the normal direction of rotation of the rotor is illustrated by the arrows, it will be seen that the projecting comb teeth 38 are inclined in the direction of such rotation, which has a tendency to cause cranberry plants received between the teeth to be forced toward the root ends of the teeth (i. e. the teeth ends secured to member 36), as the rotor turns. Since cranberry plants are more or less interwoven or matted together under normal growing conditions, such incline of the comb teeth forwardly in the direction of their translatory rotation about the rotor axis A causes the plants to be drawn into the spaces between the teeth to be stripped of berries in a rather positive manner, hence improves the "bite" or feeding action into the teeth even though the machine is advancing relatively slowly and there might otherwise be a tendency for the teeth to brush past the plants ahead of them and flatten them against the ground without causing them to enter between the teeth to be stripped of berries.

The frusto-conical shell 36 comprising the rotor body is supported by a spider structure including radial arms 40 formed in the example by eight pieces of angle iron projecting radially from the rotor hub 42. The latter rotates on an inclined spindle 44 rigidly mounted on the forward end portion of the hinged rotor mount framework 28 in the required attitude for the rotational axis A and to position the lower side of the rotor 34 generally tangential to the ground, so that as the machine progresses over the cranberry field the rotor teeth will pass through the berry plants, as desired.

Preferably the teeth are in the form of elongated steel rods ⅜ inch to ½ inch in diameter and approximately six inches long. These teeth are spaced apart approximately ¼ of an inch at their roots and diverge to ½ inch spacing at their tips. The teeth are rounded at the tips to facilitate entry of the berry plant stems into the spaces between teeth. They may be welded or otherwise attached to the frusto-conical supporting shell 36. In any case it is preferred that the inclination angle of the rotor axis A relative to the ground be approximately one-half the rotor cone angle (i. e. the angle between opposite elements of the conical surface), so that the teeth on the lower side of the cone will project forwardly approximately parallel to the ground. In practice the lowermost teeth are preferably inclined forwardly and upwardly in relation to the ground at a small angle in the order of five degrees in order to assist the berries stripped by the comb teeth to roll rearwardly on the cone interior for a purpose to be described. Preferably the cone angle as defined above is of the order of seventy-five degrees but it is not critical from the standpoint of basic operating principles.

The rotor member is caused to rotate by drive means transmitting power thereto from the power source 20. Such drive means comprises the belt and pulley transmission 46 connected to the speed reduction gear box 48, the chain and sprocket drive 50 transmitting power from the gear box 48 to the countershaft 52, representing the input to the speed reducing gear box 54 (Figure 2), which in turn is connected to the hub 42 through the chain and sprocket drive 56, as illustrated. Preferably the relative speeds at which the rotor and the traction wheels 16 turn are adjusted or set by any suitable means (not shown) in order to provide the optimum relationship for harvesting in a particular field depending upon the growing conditions of the plants.

The support and power drive means for the rotor member being carried by the vertically adjustable vehicle frame portion 28, the rotor member may be adjusted up or down to suit the nature of the plant growth encountered in any particular instance. A ground engaging shoe or runner member 58 in the form of an elongated forwardly extending slider turned upwardly at its forward end to glide over the ground serves two purposes. It serves as a gauge or stop limiting downward adjustment of the rotor member and thereby preventing the rotor member teeth from digging into the ground, and it acts as a holddown for plants still laden with berries which lie adjacent those being stripped of berries by the combing action. To accomplish these results the runner member 58 is mounted rigidly on the inclined frame structure 60 carried by the forward end of the vertically adjustable frame structure 28 and braced thereon by the diagonal brace 62. This runner member is offset transversely from the vertical plane containing the rotor axis A in the direction of rotation of the rotor teeth on the lower side of the rotor member. In other words, the runner 58 is transversely offset from the rotor's longitudinal mid-plane on the offbear side of the active stripping teeth (i.e. the side toward which the bottom teeth are moving), and as such prevents the sweeping action of these teeth from disturbing adjoining plants and shaking the berries off such plants.

The arrangements for automatically moving the cranberries stripped from the plants by the comb teeth 38 to a discharge point and dumping such berries into a container, such as the bag B, will now be described. It has been mentioned that the rotor member 34 in general is of open-end construction and that the large or base end thereof faces forwardly of the machine. It is also apparent from Figure 1 that berries stripped from plants at the lower side of the rotor member will be carried in an upwardly extending arc defined by the interior surface of the frusto-conical shell 36. As the berries follow this path they tend to roll back down, but in so doing they roll somewhat rearwardly toward the small end of the conical shell until, after one or more such upswings and rollbacks the berries are caught in any one of the eight compartment spaces 37 formed within the shell 36 between the dividing spider arms 40. When this happens the flanges of these angle iron spider arms sweep the berries upwardly on the annular backing plate 64 serving as an end closure across the annular space defined between the small end of the frusto-conical shell 36 and the cylindrical ring 66. The tubular ring 66 serves as the radially inner wall common to all of the compartments formed between the divider arms 40. The annular backing plate 64 up and along which the berries are swept by the arms 40 has an opening 64a therein which is preferably offset from the longitudinal centerline of the machine or otherwise conveniently located to permit berries dropping through said opening to fall through a guide chute 68 and into the conveniently positioned receptacle B therebeneath.

It will be evident to those skilled in the art that various equivalent arrangements for carrying the berries stripped from the cranberry plants to a discharge opening or openings through a wall exit in the stripping rotor may be devised so as to eliminate any need for stopping the machine in order to remove the berries collecting in the rotor. This illustrated arrangement is very simple and is permitted to be such, partly because of the frusto-conical form of the rotor member 34, wherein the incline and curvature of the inside cone surface is such that the berries are caused to travel toward the small end of the cone as the rotor turns and tends to carry them upward around the inside periphery thereof.

In the operation of the machine the operator seats himself on the carriage seat A, starts the engine 20 and, if necessary, completes drive connections to the traction wheels 16 and the stripping rotor member 34. The cranberry plants ordinarily form a complete cover on the growing field and are not planted in rows or bunches. The machine is steered down the field by means of the steering wheel 14 to strip the plants of cranberries along successively adjacent swaths. As the machine advances, the comb teeth 38, which are at any instant on the lower side of the frusto-conical rotor thread through the low-growing bushes and as the rotor continues to turn strip the berries from the plants. The stripping action is a continuous action as distinguished from an oscillating or intermittent action characteristic of previous harvesters, which tended to shake the berries off plants ahead of the machine due to the vibrations. The stripping action involving movement of the comb teeth generally transversely to their length is accomplished very efficiently with minimum stripping of foliage, since there is little tendency for the plants to bunch up and be compressed together between the teeth or at teeth roots as there is in the case of manual raking or raking with former types of machines in which the rake teeth are pushed ever forwardly in the direction of their length. Due to the arrangement of the rearwardly tilted rotary stripping cone it is possible for the operator to look conveniently over the top of the cone and continuously observe the action of the teeth so as to control the rate of advance of the machine, the relative rates of rotation of the rotor 36 and traction wheels 16 (if relative speed controls are provided) and the height above ground of the lower side of the rotor member in accordance with the growing conditions of the plants.

As the berries are stripped from the plants by the comb teeth 38 due to turning of the rotor, they are automatically elevated in the annular channel-like space defined between the confining tube 66 and the frusto-conical shell 36 to drop through the discharge opening 64a which is located high enough on the machine to permit placement of a container B conveniently beneath the discharge chute 68. Other mounting arrangements for a container could be used if desired in order to permit a lower positioning of the discharge opening 64a.

These and other aspects of the invention will be evident to those skilled in the art.

I claim as my invention:

1. A cranberry harvesting machine comprising, in combination, a mobile carriage adapted for travel upon a cranberry field, an annular rotor member having a series of comb teeth thereon projecting from one end of said rotor member in a direction generally endwise therefrom at closely spaced locations around substantially the entire end periphery of said rotor member, means on said carriage supporting and guiding said rotor member thereon to rotate about an axis contained in a substantially vertical plane extending generally in the normal line of travel of said carriage, with the toothed end of said rotor member facing generally forwardly with relation to said carriage, said rotor member supporting and guiding means being constructed and arranged on said carriage to dispose those teeth which at any instant lie along the lower side of said rotor member in generally parallel relation to the ground, whereby forward movement of said carriage advances such comb teeth through cranberry plants growing thereon, a source of drive power mounted on said carriage, and rotational drive means interconnecting and transmitting power from said source to said rotor member for producing substantially continuous rotation thereof, whereby cranberry plants entering into the spaces between successive comb teeth on said rotor member accompanying forward travel of the carriage are stripped of berries by rotational translation of such comb teeth in a sense generally transverse of the length of such teeth about the rotor member's axis.

2. The cranberry harvesting machine defined in claim 1, wherein the comb teeth projecting from the rotor member have projecting outer end portions inclined somewhat outwardly of said rotor member and in the direction of rotational movement of said teeth about the axis of the rotor member, whereby the rotational movement of such teeth has a tendency to draw the cranberry plants toward the roots of such teeth.

3. The cranberry harvesting machine defined in claim 1, wherein the supporting and guiding means for the rotor member establishes the rotational axis thereof at a forward and upward incline relative to the ground over which the carriage is moving, and the teeth projecting from the rotor member are disposed thereon relatively to form a generally conical pattern the cone angle of which is approximately equal to twice the inclination angle of said axis relative to the ground, whereby those teeth lying at any instant along the lower side of the rotor member are generally parallel to the ground therebeneath.

4. The cranberry harvesting machine defined in claim 3, wherein the comb teeth projecting from the rotor member have projecting outer end portions inclined somewhat outwardly of said rotor member and in the direction of rotional movement of said teeth about the axis of the rotor member, whereby the rotational movement of such teeth has a tendency to draw the cranberry plants toward the roots of such teeth.

5. The cranberry harvesting machine defined in claim 4, and a generally elongated ground-engaging runner member fixedly mounted on the carriage to project forwardly therefrom substantially horizontally and at a location relative to said carriage disposing said runner member low to the ground at a location transversely offset from the lower side of the rotor member in the direction of rotation thereof to overlie and hold down adjoining cranberry plants against disturbance by the combining action of said rotor member teeth, said runner member having an upturned forward end portion acting as a deflector permitting such runner member to glide over the ground during forward travel of the carriage.

6. The cranberry harvesting machine defined in claim 5, wherein the carriage is constructed with a base portion which remains at relatively constant height with relation to the ground over which the carriage is traveling, and a rotor mount portion adjustable up and down with relation to said base portion, said rotor mount portion carrying the rotor member supporting and guiding means, whereby the lower side of the rotor member may be adjusted to different levels above ground in accordance with the growing conditions of the cranberry plants being combed for berries.

7. The cranberry harvesting machine defined in claim 5, wherein the carriage is constructed with a base portion which remains at relatively constant height with relation to the ground over which the carriage is traveling, and a rotor mount portion adjustable up and down with relation to said base portion, said rotor mount portion carrying the rotor member supporting and guiding means and the runner member, whereby the lower side of the rotor member may be adjusted to different levels above ground in accordance with the growing conditions of the cranberry plants being combed for berries while the runner member engaging the ground acts as a stop limiting downward adjustment of said rotor member preventing uprooting of the plants by rotor member teeth digging into the ground.

8. A cranberry harvesting machine comprising in combination a mobile carriage adapted for travel upon a cranberry field, an annular rotor member of open end construction having a series of comb teeth thereon projecting from the open end of said rotor member in a direction generally endwise therefrom at closely spaced locations around substantially the entire end periphery of said rotor member, said rotor member having compartmenting members mounted therein at interval spacings around the interior thereof for elevating berries stripped from the plants by the comb teeth, stationary means mounted on said carriage covering the end of said rotor member opposite the toothed end thereof and having a discharge opening through which the elevated berries are discharged from the rotor member as the berries in each compartment are swept past such discharge opening, means on said carriage supporting and guiding said rotor member thereon to rotate about an axis contained in a substantially vertical plane extending generally in the normal line of travel of said carriage, with the toothed end of said rotor member facing generally forwardly with relation to said carriage, said rotor member supporting and guiding means being constructed and arranged on said carriage to dispose those teeth which at any instant lie along the lower side of said rotor member in generally parallel relation to the ground, whereby forward movement of said carriage advances such comb teeth through cranberry plants growing thereon, a source of drive power mounted on said carriage, and rotational drive means transmitting power from said source to said rotor member for producing substantially continuous rotation thereof, whereby cranberry plants entering into the spaces between successive comb teeth on said rotor member accompanying forward travel of the carriage are stripped of berries by rotational translation of such comb teeth in a sense generally transverse of the length of such teeth about the rotor member's axis.

9. A cranberry harvesting machine comprising in combination, a mobile carriage adapted for travel upon a cranberry field, an annular rotor member of generally frusto-conical form open at both ends and having a series of comb teeth projecting in general endwise continuation of the conical formation of said rotor member and spaced apart at locations around substantially the entire base end periphery thereof, means on said carriage supporting and guiding said rotor member thereon to rotate about an axis contained in a substantially vertical plane extending generally in the normal line of travel of said carriage, said axis being inclined to the ground in the forward sense upwardly at an angle approximately equal to one-half the rotor member cone angle whereby those teeth of the rotor member lying at any instant along the lower side of the rotor member are generally parallel to the ground therebeneath, so that forward movement of the carriage advances such comb teeth through cranberry plants growing on the ground, a source of drive power mounted on said carriage, and rotational drive means transmitting power from said source to said rotor member for producing substantially continuous rotation thereof accompanying forward advance of the carriage, whereby cranberry plants entering into the spaces between successive comb teeth of said rotor member accompanying forward travel of the carriage are stripped of berries by rotational translation of such comb teeth.

10. The cranberry harvesting machine defined in claim 9, wherein the comb teeth projecting from the end of the rotor member are inclined forwardly somewhat in the direction of rotational movement of said teeth about the axis of the rotor member, whereby the rotational movement of such teeth has a tendency to draw the cranberry plants toward the roots of such teeth.

11. The cranberry harvesting machine defined in claim 9, wherein the rotor member additionally comprises a series of generally radially extending divider elements mounted at spaced intervals around the inside periphery of said rotor member to form forwardly open receiving compartments for berries stripped from the plants by the comb teeth, the rotor member conical interior forming the radially outer wall for each such compartment, means mounted within the interior of the rotor member extending between successive divider members forming the radially inner walls of such compartments, annular plate means mounted on the carriage directly underlying and immediately adjacent the small end of the frusto-conical rotor member forming the bottom walls of such compartments, and means operatively associated with said annular plate means for effecting the discharge of berries from said compartments during rotation of the rotor member.

12. The cranberry harvesting machine defined in claim 11, wherein the annular plate means underlying the rotor member is mounted stationarily on the carriage relative to the rotor member supporting and guiding means and has an aperture therein forming the means for the discharge of berries from the compartments, and means operatively associated with said discharge means for guiding the discharged berries into a container supported on the carriage.

13. The cranberry harvesting machine defined in claim 12, wherein the carriage is constructed with a base portion which remains at relatively constant height with relation to the ground over which the carriage is traveling, and a rotor mount portion adjustable up and down with relation to said base portion, said rotor mount portion carrying the rotor member supporting and guiding means, whereby the lower side of the rotor member may be adjusted to different levels above ground in accordance with the growing conditions of cranberry plants being combed for berries.

14. The cranberry harvesting machine defined in claim 13, and a ground-engaging runner member fixedly mounted on the rotor mount portion of the carriage to project forwardly therefrom substantially horizontally and low to the ground at a location transversely offset from the lower side of the rotor member in the direction of rotation thereof to overlie and hold down adjoining cranberry plants against disturbance by the combing action of said rotor member teeth, said runner member being fixed in vertical relation to the rotor member guiding and supporting means and being mounted at a level slightly below the lower side of said rotor member, whereby said runner member prevents embedment of the rotor member teeth in the ground.

15. The machine defined in claim 13, wherein the rotor mount portion of the carriage is hingedly connected to the base portion rearwardly of the forward end of said rotor mount portion, and the supporting and guiding means for the rotor member are mounted on the rotor mount portion forwardly of the hinge axis.

References Cited in the file of this patent

UNITED STATES PATENTS

| | | |
|---|---|---|
| 944,438 | Holmested | Dec. 28, 1909 |
| 1,122,798 | Palmer | Dec. 29, 1914 |
| 2,486,766 | Stenzel | Nov. 1, 1949 |
| 2,532,652 | Wray | Dec. 5, 1950 |
| 2,588,599 | Winter | Mar. 11, 1952 |